US012112016B2

(12) United States Patent
Han

(10) Patent No.: US 12,112,016 B2
(45) Date of Patent: *Oct. 8, 2024

(54) ICON ARRANGING METHOD AND APPARATUS, AND ELECTRONIC DEVICE

(71) Applicant: VIVO MOBILE COMMUNICATION CO., LTD., Guangdong (CN)

(72) Inventor: Guimin Han, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,920

(22) Filed: Sep. 28, 2023

(65) Prior Publication Data

US 2024/0019987 A1 Jan. 18, 2024

Related U.S. Application Data

(63) Continuation of application No. 18/094,183, filed on Jan. 6, 2023, which is a continuation of application No. PCT/CN2021/105217, filed on Jul. 8, 2021.

(30) Foreign Application Priority Data

Jul. 8, 2020 (CN) .......................... 202010650017.7

(51) Int. Cl.
*G06F 3/04817* (2022.01)
*G06F 3/0482* (2013.01)
*G06F 3/0488* (2022.01)

(52) U.S. Cl.
CPC ........ *G06F 3/04817* (2013.01); *G06F 3/0482* (2013.01); *G06F 3/0488* (2013.01)

(58) Field of Classification Search
CPC ... G06F 3/04817; G06F 3/0482; G06F 3/0488
See application file for complete search history.

(56) References Cited

U.S. PATENT DOCUMENTS

| 2007/0186177 A1* | 8/2007 | Both .................. G06F 3/04817 |
| | | 715/764 |
| 2012/0062599 A1* | 3/2012 | Machida ............... G06F 3/0482 |
| | | 345/655 |

(Continued)

FOREIGN PATENT DOCUMENTS

| CN | 102968247 A | 3/2013 |
| CN | 103294401 A | 9/2013 |

(Continued)

OTHER PUBLICATIONS

Extended European Search Report for Application No. 21836975.9, dated Dec. 13, 2023, 9 Pages.

(Continued)

*Primary Examiner* — Seth A Silverman
(74) *Attorney, Agent, or Firm* — Brooks Kushman P.C.

(57) ABSTRACT

An icon arranging method and apparatus, and an electronic device and belongs to the field of communication technologies. The method includes: receiving a first input on a plurality of icons (101); and arranging the plurality of icons in an arrangement manner corresponding to an input parameter of the first input in response to the first input (102), where the input parameter includes at least one of an input direction and an input track.

20 Claims, 9 Drawing Sheets

(56) References Cited

U.S. PATENT DOCUMENTS

| | | | | |
|---|---|---|---|---|
| 2014/0349753 | A1* | 11/2014 | Imai | G06F 8/63 463/31 |
| 2015/0026632 | A1* | 1/2015 | Wakabayashi | H04N 23/69 715/776 |
| 2015/0370456 | A1* | 12/2015 | Kobayashi | G06F 3/0489 463/32 |
| 2018/0150208 | A1 | 5/2018 | Song et al. | |

FOREIGN PATENT DOCUMENTS

| | | |
|---|---|---|
| CN | 103324414 A | 9/2013 |
| CN | 104503660 A | 4/2015 |
| CN | 104808986 A | 7/2015 |
| CN | 105630286 A | 6/2016 |
| CN | 105843480 A | 8/2016 |
| CN | 106201191 A | 12/2016 |
| CN | 106775190 A | 5/2017 |
| CN | 106896988 A | 6/2017 |
| CN | 107203307 A | 9/2017 |
| CN | 107809534 A | 3/2018 |
| CN | 111078069 A | 4/2020 |
| CN | 111273993 A | 6/2020 |
| CN | 111831180 A | 10/2020 |
| WO | 2017166357 A1 | 10/2017 |

OTHER PUBLICATIONS

First Office Action for Chinese Application No. 202010650017.7, dated Jun. 1, 2021, 12 Pages.

International Search Report and Written Opinion for Application No. PCT/CN2021/105217, dated Oct. 11, 2021, 10 Pages.

Non-final Rejection for copending U.S. Appl. No. 18/094,183, dated Jun. 28, 2023, 7 pages.

* cited by examiner

ICON ARRANGING METHOD AND APPARATUS, AND ELECTRONIC DEVICE

CROSS-REFERENCE TO RELATED APPLICATIONS

This application is a continuation of U.S. patent application Ser. No. 18/094,183 filed on Jan. 6, 2023, which is a continuation application of International Application No. PCT/CN2021/105217 filed on Jul. 8, 2021, which claims priority to Chinese patent application No. 202010650017.7 filed on Jul. 8, 2020, which are incorporated herein by reference in their entireties.

TECHNICAL FIELD

This application belongs to the field of communication technologies, and in particular, to an icon arranging method and apparatus, and an electronic device.

BACKGROUND

With increasingly abundant types of applications, there are more desktop icons on electronic devices. To find icons conveniently and quickly, users can arrange the icons through manual operation. When the user needs to move an icon, the user can operate the icon to move the icon to a specific position.

During implementation of the operations, the inventor found that there are at least the following problems in the prior art: when a user arranges icons, the user needs to operate each icon to move the icon. When a quantity of desktop icons is large, the operations are cumbersome.

SUMMARY

Embodiments of the present invention provide an icon arranging method and apparatus, and an electronic device, which can resolve a problem of complex operations when icons are arranged.

In order to resolve the technical problems above, the present invention is implemented as follows:

According to a first aspect, an embodiment of the present invention provides an icon arranging method, including:
  receiving a first input on a plurality of icons; and
  arranging the plurality of icons in an arrangement manner corresponding to an input parameter of the first input in response to the first input, where
  the input parameter includes at least one of an input direction and an input track.

According to a second aspect, an embodiment of this application further provides an icon arranging apparatus, including:
  a receiving module, configured to receive a first input on a plurality of icons; and
  an arrangement module, configured to arrange the plurality of icons in an arrangement manner corresponding to an input parameter of the first input in response to the first input, where
  the input parameter includes at least one of an input direction and an input track.

According to a third aspect, an embodiment of this application provides an electronic device, including a processor, a memory, and programs or instructions stored in the memory and capable of being run on the processor, where the programs or the instructions are executed by the processor to implement the steps of the method according to the first aspect.

According to a fourth aspect, an embodiment of this application provides a readable storage medium, storing programs or instructions, where the programs or the instructions are executed by a processor to implement the steps of the method according to a first aspect.

According to a fifth aspect, an embodiment of this application provides a chip, including a processor and a communication interface, where the communication interface is coupled to the processor, and the processor is configured to run programs or instructions to implement the method according to the first aspect.

According to a sixth aspect, an embodiment of this application provides a computer software product, stored in a non-volatile storage medium, where the software product is configured to be executed by at least one processor to implement the steps of the method according to the first aspect.

According to a seventh aspect, an embodiment of this application provides an electronic device, configured to perform the method according to the first aspect.

In the embodiments of this application, a first input on a plurality of icons is received; and the plurality of icons are arranged in an arrangement manner corresponding to an input parameter of the first input in response to the first input, where the input parameter includes at least one of an input direction and an input track. In this way, a user may simultaneously perform an input on a plurality of icons, so that the plurality of icons are simultaneously arranged in batches according to an input parameter of the user input, to reduce operations by the user.

DETAILED DESCRIPTION

The technical solutions in the embodiments of this application are clearly and completely described in the following with reference to the accompanying drawings in the embodiments of this application. Apparently, the described embodiments are some rather than all of the embodiments of this application. All other embodiments obtained by a person skilled in the art based on the embodiments of this application without creative efforts shall fall within the protection scope of this application.

The specification and claims of this application, and terms "first" and "second" are used to distinguish similar objects, but are not used to describe a specific sequence or order. It should be understood that the data termed in such a way are interchangeable in appropriate circumstances, so that the embodiments of this application can be implemented in orders other than the order illustrated or described herein. In addition, "and/or" in the description and the claims means at least one of the connected objects, and the character "/" in this specification generally indicates an "or" relationship between the associated objects.

An icon arranging method provided in the embodiments of this application is described in detail below with reference to the accompanying drawings by using specific embodiments and application scenarios thereof.

Figure 1:
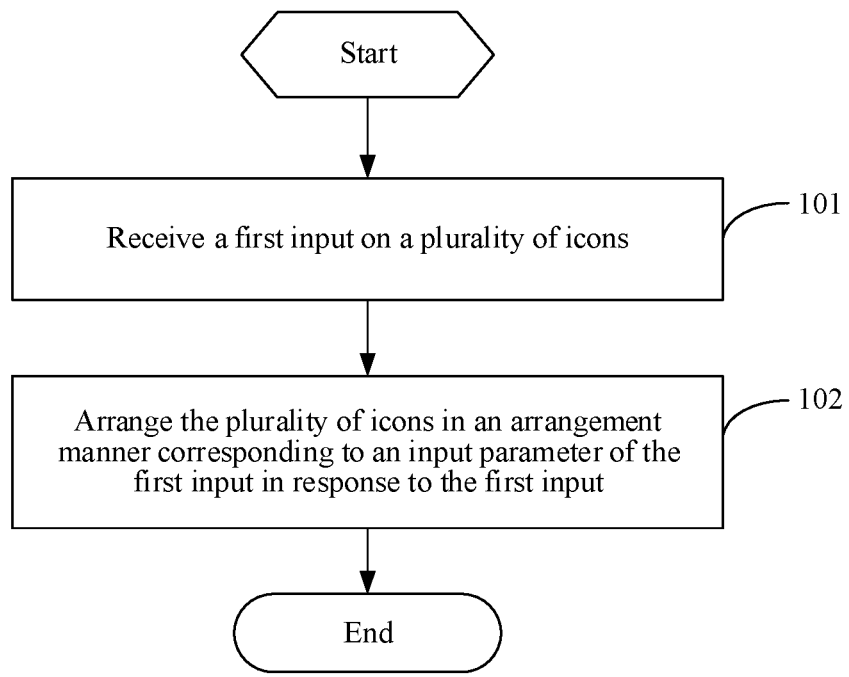
FIG. 1 is a flowchart of an icon arranging method according to an embodiment of the present invention.

FIG. 1 is a flowchart of an icon arranging method according to an embodiment of the present invention. As shown in FIG. 1, the method includes the following steps:

Step 101. Receive a first input on a plurality of icons.

In this step, the plurality of icons include at least two icons, the plurality of icons may include an icon of an application program, an icon of a folder, and the like, and the plurality of icons may be icons of a same type or different types. A user may simultaneously perform a first input on a plurality of icons by using a plurality of fingers and may further operate at least some icons in the plurality of icons after selecting the plurality of icons by using the first input.

The first input may be a sliding operation, a dragging operation, a pressing operation, or the like, and the first input may further include a voice input.

Step 102. Arrange the plurality of icons in an arrangement manner corresponding to an input parameter of the first input in response to the first input.

the input parameter includes at least one of an input direction and an input track.

In this step, an electronic device may move the plurality of icons according to the input parameter, to arrange the plurality of icons adjacent to each other or in a specific manner, or arrange and display the plurality of icons according to the input parameter in a specific arrangement manner, to arrange the plurality of icons in batches. The input parameter may further be an input distance or another parameter.

Figure 2:
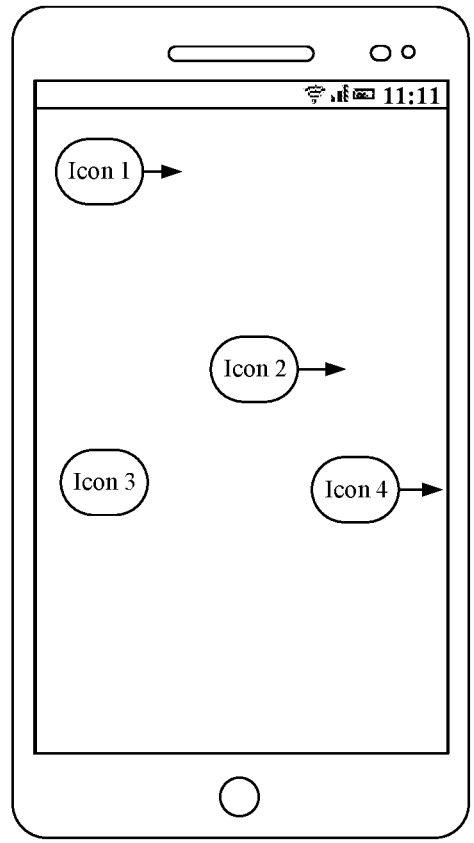
FIG. 2 to FIG. 16 are schematic diagrams of interfaces of an electronic device according to an embodiment of the present invention.
Figure 3:
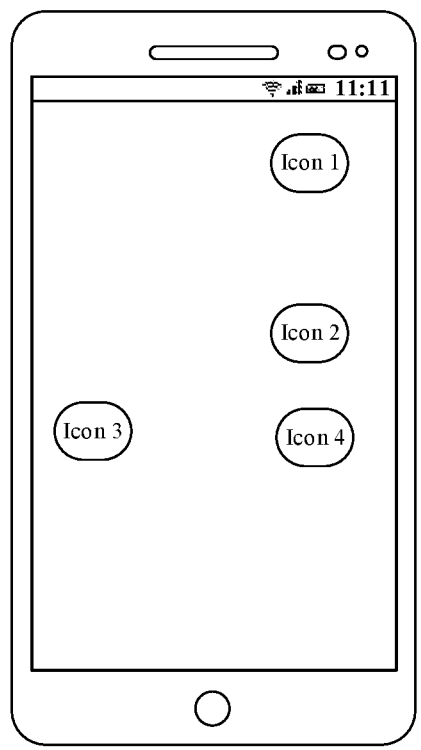

For example, as shown in FIG. 2, the user performs an operation of sliding to right on an icon 1, an icon 2, and an icon 4, and the electronic device arranges the icon 1, the icon 2, and the icon 4 in a same column in response to the operation by the user, as shown in FIG. 3. Only an example is used herein, and the plurality of icons may further be arranged into a circle, a square, or the like in another arrangement manner.

In this embodiment of the present invention, the plurality of icons can be rapidly arranged in batches according to the operation by the user, to reduce operations of the user.

Optionally, the input parameter includes the input direction; and
the arranging the plurality of icons in an arrangement manner corresponding to an input parameter of the first input includes:
displaying the plurality of icons in a target row or a target column, where
the target row or the target column is determined based on the input direction, and an angle between the target row and the input direction and an angle between the target column and the input direction are greater than a first preset angle and less than a second preset angle.

In this implementation, the target row or the target column is determined according to the input direction, and then the plurality of icons are displayed in the target row or the target column, that is, the plurality of arranged icons are located in the same row or the same column, and the plurality of icons may be adjacent or not adjacent. A plurality of icons before arrangement may be displayed in different rows or different columns, the plurality of icons can be displayed in the same row or the same column through the operation, and the plurality of icons can be rapidly arranged.

Both an angle between the input direction and a direction of the target row and an angle between the input direction and a direction of the target column are within a preset angle range, that is, are greater than a first preset angle and less than a second preset angle. The target row or the target column corresponding to the input direction may be determined according to the input direction and the angle range.

For example, if the angle between the input direction and the target column is 60°, the plurality of icons are displayed in the target column according to the input direction. The angle value herein is merely an example for ease of understanding, and another angle also falls within the protection scope of the present invention.

In this implementation of the present invention, a plurality of icons can be rapidly arranged into a same row or a same column based on an operation by the user, to reduce the operations by the user and improve the operation efficiency.

Further, before the displaying the plurality of icons in a target row or a target column, the method further includes:
respectively displaying the plurality of icons in at least one initial column; and
the displaying the plurality of icons in a target row or a target column includes:
respectively displaying the plurality of icons in the target row, where
the target row is determined based on the input direction, the target row is perpendicular to the input direction, the plurality of icons in the target row are respectively displayed in a plurality of final columns, and the initial column and the final column of each icon of the plurality of icons are the same.

Figure 4:
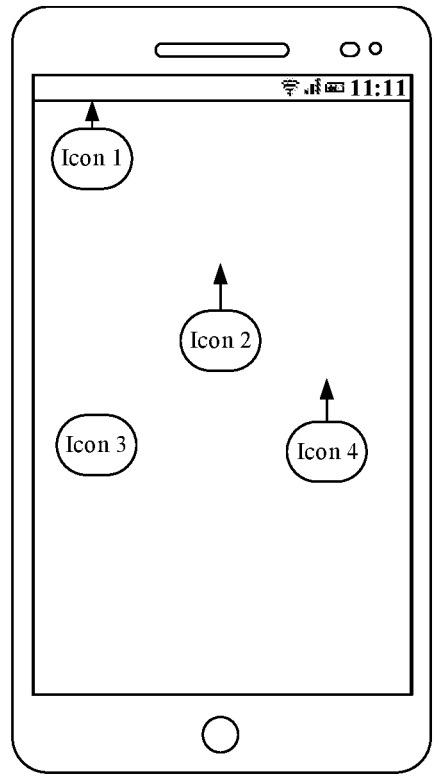
Figure 5:
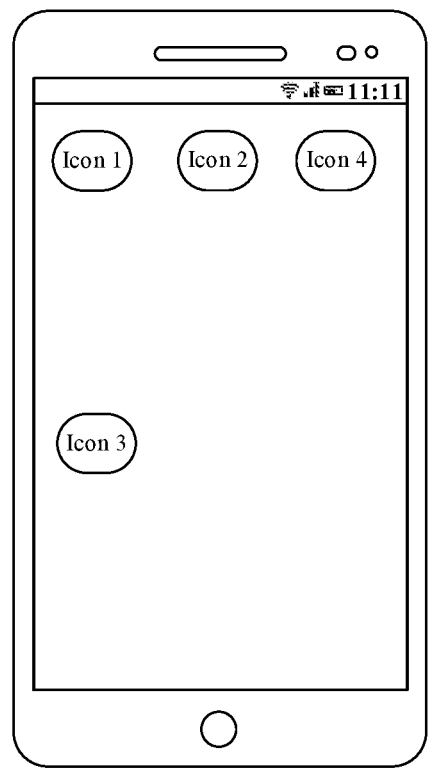

For example, as shown in FIG. 4, initial columns of the icon 1, the icon 2, and the icon 4 are respectively a first column, a second column, and a third column, and the user performs an upward multi-finger sliding operation on the icon 1, the icon 2, and the icon 4. The electronic device determines that the target row is a first row of the icon 1 based on the sliding operation and displays all the icon 1, the icon 2, and the icon 4 in the target row, that is, the first row. Final columns of the icon 1, the icon 2, and the icon 4 that are in the first row are respectively the first column, the second column, and the third column, that is, the initial column and the final column of each icon are kept unchanged, as shown in FIG. 5.

The solution may further be replaced with the following:
before the displaying the plurality of icons in a target row or a target column, the method further includes:
respectively displaying the plurality of icons in at least one initial row; and
the displaying the plurality of icons in a target row or a target column includes:
respectively displaying the plurality of icons in the target column, where
the target column is determined based on the input direction, the target column is perpendicular to the input direction, the plurality of icons in the target column are respectively displayed in a plurality of final rows, and the initial row and the final row of each icon of the plurality of icons are the same.

For example, as shown in FIG. 2, initial rows of the icon 1, the icon 2, and the icon 4 are respectively a first row, a third row, and a fourth row, and the user performs a rightward multi-finger sliding operation on the icon 1, the icon 2, and the icon 4. The electronic device determines that the target column is a third column of the icon 4 based on the sliding operation and displays all the icon 1, the icon 2, and the icon 4 in the target column, that is, the third column.

Final rows of the icon 1, the icon 2, and the icon 4 that are in the third column are respectively the first row, the third row, and the fourth row, that is, the initial row and the final row of each icon are kept unchanged, as shown in FIG. 3.

In this implementation of the present invention, a row or a column of an icon is kept unchanged before movement and after movement, making it convenient for the user to rapidly view a position of the icon, thereby improving an icon arrangement effect.

Optionally, the target row is perpendicular to the input direction, or the target column is perpendicular to the input direction.

In this implementation, the target row or the target column can be determined according to the input direction according to the fact that the target row or the target column is perpendicular to the input direction, so that the plurality of icons are arranged and displayed in the target row or the target column.

For example, the user performs an operation of sliding to right on a plurality of icons, and the electronic device obtains a rightward direction of the sliding operation in response to the operation by the user and determines a target column perpendicular to the sliding direction, to display the plurality of icons in the target column.

In this implementation of the present invention, a plurality of icons can be rapidly arranged into a same row or a same column based on an operation direction by the user, to reduce the operations by the user and improve the operation efficiency.

Optionally, the input parameter further includes the input distance, and the target row or the target column is associated with the input distance.

For example, when the input distance is relatively large, the target row or the target column is relatively far away from initial positions of the plurality of icons; and when the input distance is relatively small, the target row or the target column is relatively close to the initial positions of the plurality of icons. It is convenient for the user to rapidly display the plurality of icons in specific positions.

Optionally, before the receiving a first input on a plurality of icons, the method further includes:
  displaying a first icon in the target row or the target column; and
  the displaying the plurality of icons in a target row or a target column includes:
  displaying the plurality of icons in the target row or the target column where the first icon is located, where the first icon is an icon closest to a target screen edge in the plurality of icons, and the target screen edge is a screen edge to which the input direction points.

In this implementation, a target screen edge may be determined based on the input direction, and an icon closest the target screen edge in the plurality of icons is a first icon. A target row or a target column may be determined based on a row and a column of the first icon and the input direction. The target row or the target column includes the first icon, and an angle between the input direction and the target row or the target column is within a preset angle range.

The plurality of icons are arranged in the target row where the first icon is located, or the plurality of icons are arranged in the target column where the first icon is located, to keep a position of the first icon unchanged.

For example, as shown in FIG. 2, the user performs an operation of sliding to right on the icon 1, the icon 2, and the icon 4, and the electronic device determines that a right screen edge is a target screen edge according to a direction to which the sliding direction points and the icon 4 closest to the target screen edge is the first icon in response to the operation by the user; and moves the icon 1 and the icon 2 to the right, so that the icon 1, the icon 2, and the icon 4 are arranged in the column where the icon 4 is located, as shown in FIG. 3.

In another example, as shown in FIG. 4, the user performs an operation of sliding upward on the icon 1, the icon 2, and the icon 4, and the electronic device determines that an upper screen edge is a target screen edge according to a direction to which the sliding direction points and the icon 1 closest to the target screen edge is the first icon in response to the operation by the user; and moves the icon 2 and the icon 4 upward until the icon 1, the icon 2, and the icon 4 are arranged in the row where the icon 1 is located, as shown in FIG. 5.

In this implementation, the target row or the target column is determined based on the position of the first icon and the input direction, and the plurality of icons can be displayed in a specific row or column in a targeted manner, which can meet a requirement of the user.

Optionally, the displaying the plurality of icons in a target row or a target column includes:
  respectively displaying the plurality of icons in the target column, and keeping display rows corresponding to the plurality of icons unchanged;
  or
  respectively displaying the plurality of icons in the target row, and keeping display columns corresponding to the plurality of icons unchanged.

In this implementation, further, in a case that the plurality of icons are displayed in the target column, a row where each icon is located is kept unchanged; or in a case that the plurality of icons are displayed in the target row, a column where each icon is located is kept unchanged.

For example, as shown in FIG. 2, the user performs an operation of sliding to right on the icon 1, the icon 2, and the icon 4, and the electronic device moves the icon 1 and the icon 2 to the right in response to the operation by the user and keeps a row where each icon is located unchanged, so that the icon 1, the icon 2, and the icon 4 are arranged in the same column, as shown in FIG. 3.

In another example, as shown in FIG. 4, the user performs an operation of sliding upward on the icon 1, the icon 2, and the icon 4, and the electronic device moves the icon 2 and the icon 4 upward in response to the operation by the user and keeps a column where each icon is located unchanged until the icon 1, the icon 2, and the icon 4 are arranged in the same row, as shown in FIG. 5.

In this implementation, the target row or the target column is determined based on rows or columns where the plurality of icons are located and the input direction, and the plurality of icons can be arranged in a specific manner in a targeted manner, which can meet the requirement of the user.

Optionally, in a case that an initial row of a fifth icon in the plurality of icons is the same as an initial row of the first icon, the initial row of the fifth icon is different from the final row thereof; or
  in a case that an initial column of a fifth icon in the plurality of icons is the same as an initial column of the first icon, the initial column of the fifth icon is different from the final column thereof.

Figure 6:
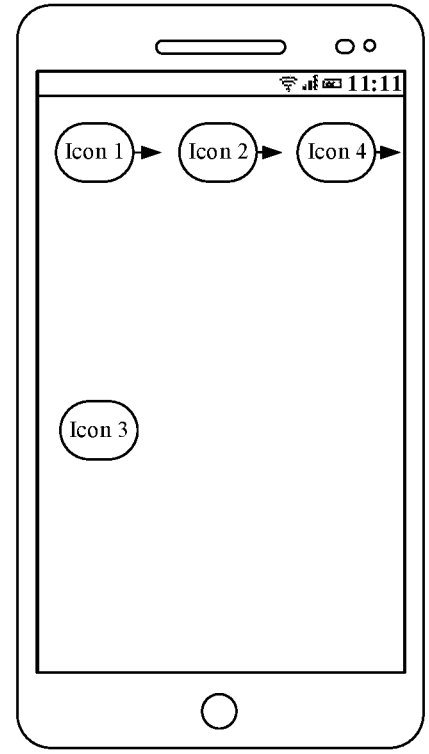
Figure 7:
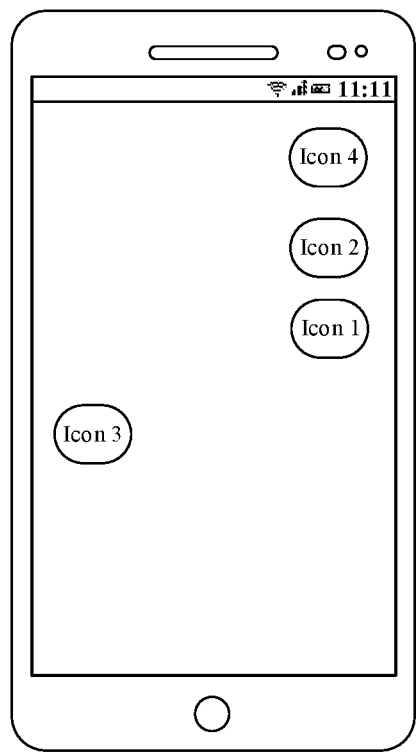

For example, as shown in FIG. 6, initial rows of the icon 1, the icon 2, and the icon 4 are all a first row, an initial column of the icon 1 is a first column, an initial column of the icon 2 is a second column, an initial column of the icon 4 is a third column, and the user performs an operation of sliding to right on the icon 1, the icon 2, and the icon 4. The electronic device displays the icon 1, the icon 2, and the icon 4 in a same column, that is, the third column where the icon 4 is located, in response to the operation by the user, a final row of the icon 1 is a third row, a final row of the icon 2 is a second row, and a final row of the icon 4 is the first row. That is, both the final rows of the icon 1 and the icon 2 are different from the initial rows, as shown in FIG. 7.

Similarly, in the plurality of icons, in a case that the initial column of the fifth icon is the same as the initial column of the first icon, the position of the first icon may be kept unchanged, and the fifth icon is displayed in the final row where the first icon is located, that is, the final column of the fifth icon is different from the initial column thereof. No example is provided again for description herein.

In this implementation of the present invention, it is convenient to arrange a plurality of icons in a same row or a same column in different positions, which can improve the arrangement efficiency.

Optionally, in a case that the initial rows of at least two sixth icons in the plurality of icons are the same, the at least two sixth icons in the target column is located in a first folder, and a row where the first folder is located is the same as the initial row of the sixth icon; or in a case that the initial columns of at least two seventh icons in the plurality of icons are the same, the at least two seventh icons in the target row is located in a second folder, and a column where the second folder is located is the same as the initial column of the seventh icon.

In this implementation, if at least two sixth icons are located in a same initial row, the at least two sixth icons may be placed in a first folder, the first folder may be displayed in a target column, and a row where the first folder is located is kept as the initial row of the at least two sixth icons.

Figure 8:
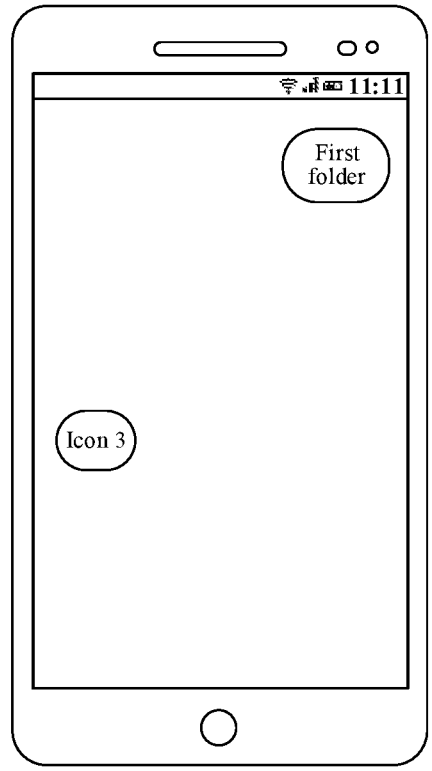

For example, as shown in FIG. 6, the icon 1, the icon 2, and the icon 4 are respectively displayed in different columns in a first row, the user performs an operation of sliding to right on the icon 1, the icon 2, and the icon 4, the electronic device create a first folder and moves the icon 1, the icon 2, and the icon 4 to the first folder in response to the operation by the user, and displays the first folder in a target column, that is, a column where the icon 4 is located, and the first folder is still displayed in the first row, as shown in FIG. 8.

Similarly, for the case that the initial columns of the at least two seventh icons are the same, reference may also be made to the listed manner, and no example is described herein again.

It should be noted that the at least two sixth icons and the at least two seventh icons may further include icons of the folders. For example, the user performs a multi-finger sliding operation on two sixth icons in a same row and one folder icon, and the electronic device moves the two sixth icons to the folder icon in response to the operation by the user. In this way, the plurality of icons is conveniently and rapidly arranged. In addition, the first folder or the second folder may further be named according to types of icons in the folder.

Optionally, the input direction includes a first input direction and a second input direction, and the target row or the target column is determined based on the first input direction; and after the displaying the plurality of icons in a target row or a target column, the method further includes:

moving the plurality of icons within the target row or the target column along the second input direction, so that every two icons in the target row or the target column are adjacent to each other.

In this implementation, if vacant icon positions exist among the plurality of icons after the plurality of icons are arranged in the target row or the target column, a plurality of icons may further be arranged one after another, so that every two of the plurality of icons are adjacent to each other. Specifically, the icons may be shifted toward the second input direction according to the second input direction.

Figure 9:
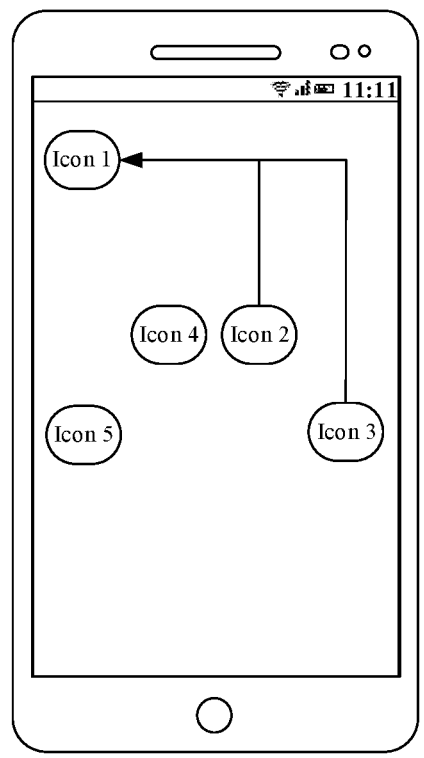
Figure 10:
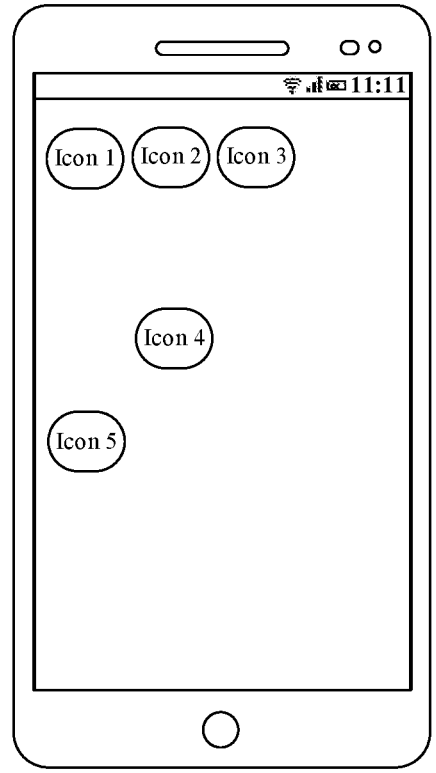

For example, as shown in FIG. 9, the user slides the icon 1, the icon 2, and an icon 3 upward (that is, the first input direction), and then slides the icon 1, the icon 2, and the icon 3 to the left (that is, the second input direction), and the electronic device first moves the icon 2 and the icon 3 to a row where the icon 1 is located and then shifts the icon 2 and the icon 3 to the left in response to the operation by the user, so that the icon 1, the icon 2, and the icon 3 are adjacent, as shown in FIG. 10. If another icon and a vacant position exist between the icon 1 and the icon 2 after the icon 1, the icon 2, and the icon 3 are located in the same row, the icon 2 and the icon 3 may be sequentially moved leftward to the vacant positions adjacent to the icon 1, that is, shifting to the left.

In this implementation of the present invention, alignment and absorption operations can be rapidly performed on the icons, to rapidly arrange the icons.

Optionally, the input parameter includes the input track, and the arranging the plurality of icons in an arrangement manner corresponding to an input parameter of the first input includes:

arranging the plurality of icons according to a pattern formed by the input track.

In this implementation, icons can be arranged in different shapes according to the pattern formed by the input track.

In a case that the first input includes a plurality of inputs on the plurality of icons, the input track may include a pattern formed by a plurality of input tracks of the plurality of inputs or a pattern formed by some input tracks of the plurality of inputs.

In this implementation, the icons can be arranged according to the pattern formed by the input track, to improve the flexibility of icon arrangement.

Optionally, the receiving a first input on a plurality of icons includes:

receiving a first sub-input on a second icon in the plurality of icons, and receiving a second sub-input on a third icon in the plurality of icons; and the arranging the plurality of icons according to a pattern formed by the input track includes:

arranging the plurality of icons according to the pattern formed by the input track, where a position of the third icon is kept unchanged.

In this implementation, the plurality of icons include a second icon and a third icon. The user may respectively perform a first sub-input on the second icon and the second sub-input on the third icon. The first sub-input and the second sub-input may be respectively a pressing input, a sliding input, a dragging input, or the like, and the first sub-input and the second sub-input may be the same input or different types of inputs.

During arrangement, a position of the third icon is kept unchanged, and the second icon is moved to a preset region where the third icon is located, so that the plurality of icons are arranged according to a pattern formed by an input track.

Figure 11:
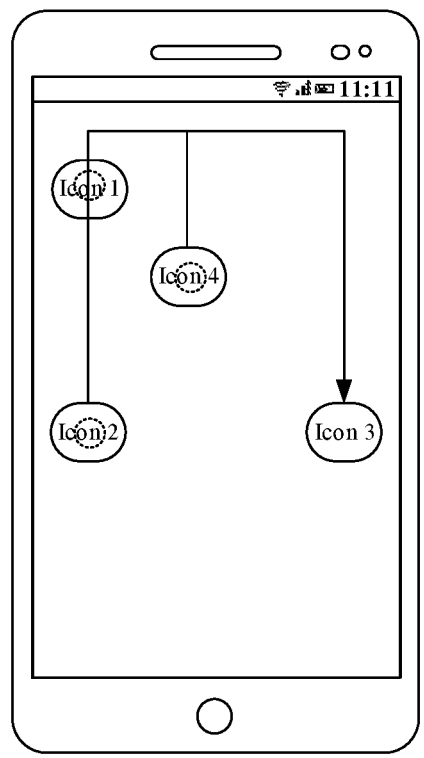
Figure 12:
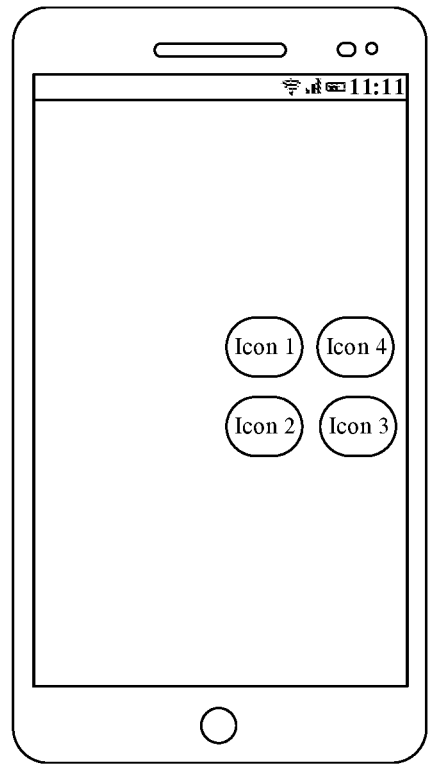

For example, as shown in FIG. 11, the user presses the icon 3 by using a finger of one hand and simultaneously performs a sliding operation on the icon 1, the icon 2, and the icon 4 by using the other hand. Specifically, a three-finger sliding operation may be simultaneously performed on the three icons or a sliding operation may be performed on some icons of the three icons after the three icons are selected. A sliding track of the sliding operation obtained by the electronic device is moving upward, then moving right, and then moving downward, where the sliding track forms three sides of a rectangle. The electronic device arranges the icon 1, the icon 2, the icon 3, and the icon 4 into the rectangle according to the three sides formed by the sliding track by using the icon 3 as a corner of the rectangle, as shown in FIG. 12.

Figure 13:
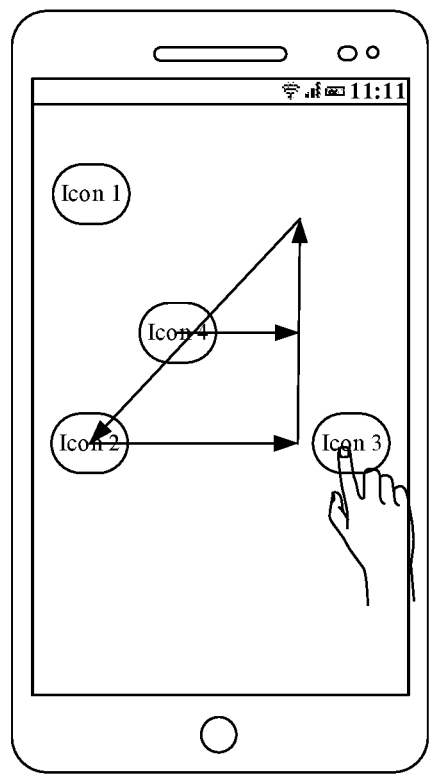
Figure 14:
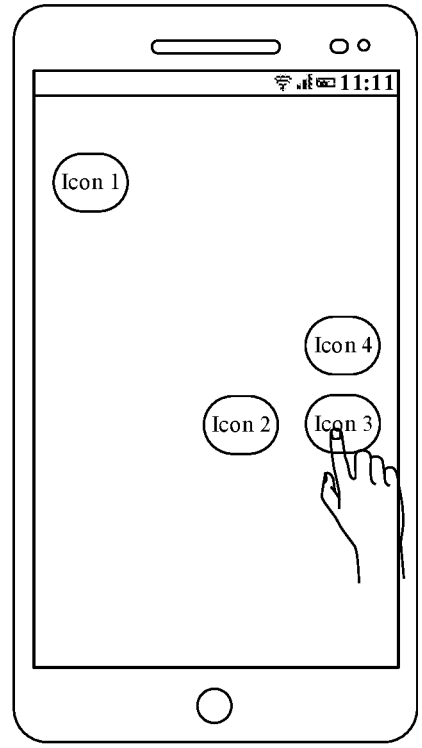

If a sliding track of the finger is similar to a triangle, the icons are arranged into the triangle. As shown in FIG. 13, the user presses the icon 3 by using a finger of one hand and simultaneously slides the icon 2 and the icon 4 to the right, then upward, and then to the lower left by using another hand, and a sliding track forms a triangle, where arrows represents sliding directions and sliding tracks corresponding to the icons. The electronic device moves the icon 2 and the icon 4 by using the icon 3 as a fixed icon, to arrange the icon 2, the icon 3, and the icon 4 into the triangle, as shown in FIG. 14.

In this implementation of the present invention, the icons can be arranged in a customized shape based on an operation track, so that the icons are arranged in batches, and an arrangement effect and a degree of freedom of arrangement can be improved.

Optionally, at least a subset of the plurality of icons is displayed at a first position, and a fourth icon is displayed at a second position; and the arranging the plurality of icons in an arrangement manner corresponding to an input parameter of the first input includes:

arranging the plurality of icons in the arrangement manner corresponding to the input parameter of the first input, where the at least subset of the plurality of icons is moved from the first position to the second position, and the fourth icon is moved from the second position to the first position.

In this implementation, at least a subset of the plurality of icons is displayed at a first position, and a fourth icon is displayed at a second position. During arrangement of the plurality of icons, the position of the at least subset of the plurality of icons and the position of the fourth icon may be exchanged, that is, the at least subset is moved from the first position to the second position, and the fourth icon is moved from the second position to the first position.

A quantity of fourth icons may be equal to a quantity of at least subset, and the position of the fourth icon and the position of the at least a subset are respectively exchanged.

Figure 15:
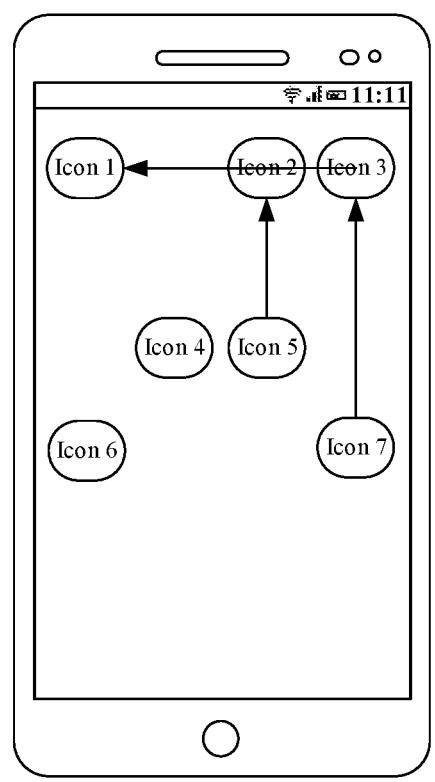
Figure 16:
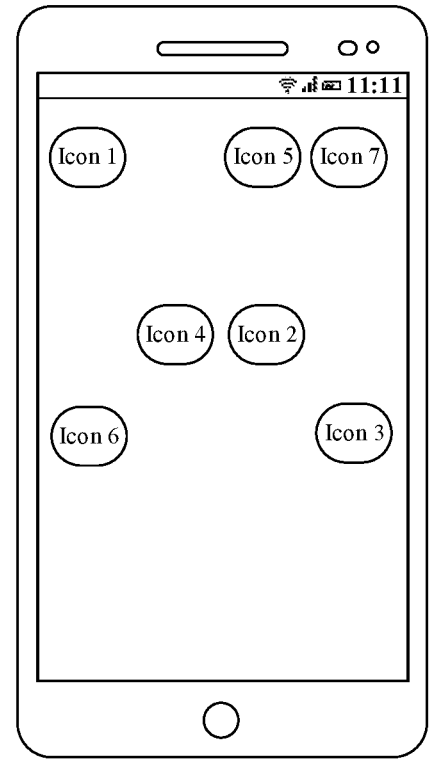

For example, as shown in FIG. 15, the user simultaneously performs an upward sliding operation on the icon 1, an icon 5, and an icon 7. The electronic device moves the icon 5 and the icon 7 upward in response to the operation by the user, so that the icon 1, the icon 5, and the icon 7 are located in a row where the icon 1 is located. Because the icon 2 and the icon 3 exist at positions to which the icon 5 and the icon 7 are moved, positions of the icon 5 and the icon 2 are exchanged, and positions of the icon 7 and the icon 3 are exchanged, as shown in FIG. 16. If the user continues to slide the icon 1, the icon 5, and the icon 7 to the left after sliding the icon 1, the icon 5, and the icon 7 upward, the icon 5 and the icon 7 are continuously shifted to the left after being moved to a row where the icon 1 is located, so that the icon 1, the icon 5, and the icon 7 are displayed adjacent to each other.

In this way, a plurality of icons can be arranged in a specific order, to improve an arrangement effect of the plurality of icons.

It should be noted that the plurality of implementations in the embodiments of the present invention may be implemented separately or in combination, and the example is only an example of one implementation and does not constitute a limitation on a specific implementation.

It should be noted that, the icon arranging method provided in the embodiments of this application may be performed by an icon arranging apparatus or a control module in the icon arranging apparatus configured to perform and load the icon arranging method. In this embodiment of this application, the icon arranging method provided in the embodiments of this application is described by using an example in which the icon arranging apparatus performs and loads the icon arranging method.

Figure 17:
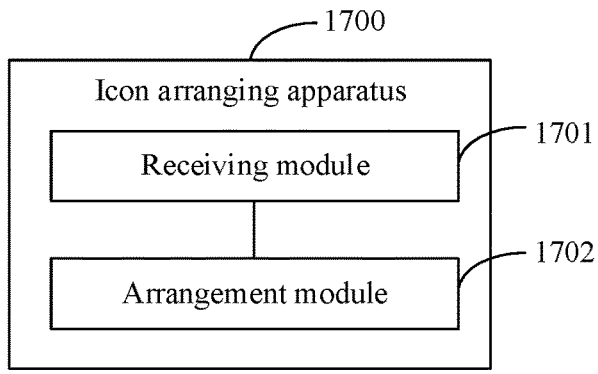
FIG. 17 is a structural diagram of an icon arranging apparatus according to an embodiment of the present invention.

FIG. 17 is a structural diagram of an icon arranging apparatus 1700 according to an embodiment of the present invention. As shown in FIG. 17, the icon arranging apparatus 1700 includes:

a receiving module 1701, configured to receive a first input on a plurality of icons; and an arrangement module 1702, configured to arrange the plurality of icons in an arrangement manner corresponding to an input parameter of the first input in response to the first input, where the input parameter includes at least one of an input direction and an input track.

Optionally, the input parameter includes the input direction; and the arrangement module is further configured to:

display the plurality of icons in a target row or a target column, where the target row or the target column is determined based on the input direction, and an angle between the target row and the input direction and an angle between the target column and the input direction are greater than a first preset angle and less than a second preset angle.

Optionally, the target row is perpendicular to the input direction, or the target column is perpendicular to the input direction.

Optionally, the apparatus further includes:

a display module, configured to display a first icon in the target row or the target column; and the arrangement module is further configured to:

display the plurality of icons in the target row or the target column where the first icon is located, where the first icon is an icon closest to a target screen edge in the plurality of icons, and the target screen edge is a screen edge to which the input direction points.

Optionally, the arrangement module is further configured to:

respectively display the plurality of icons in the target column, and keep display rows corresponding to the plurality of icons unchanged;

or respectively display the plurality of icons in the target row, and keep display columns corresponding to the plurality of icons unchanged.

Optionally, the input direction includes a first input direction and a second input direction, and the target row or the target column is determined based on the first input direction; and the apparatus further includes:

a moving module, configured to move the plurality of icons within the target row or the target column along the second input direction, so that every two icons in the target row or the target column are adjacent to each other.

Optionally, the input parameter includes the input track, and the arrangement module is further configured to:

arrange the plurality of icons according to a pattern formed by the input track.

Optionally, the receiving module is further configured to:

receive a first sub-input on a second icon in the plurality of icons, and receive a second sub-input on a third icon in the plurality of icons; and the arrangement module is further configured to:

arrange the plurality of icons according to the pattern formed by the input track, where a position of the third icon is kept unchanged.

Optionally, at least a subset of the plurality of icons is displayed at a first position, and a fourth icon is displayed at a second position; and the arrangement module is further configured to:

arrange the plurality of icons in the arrangement manner corresponding to the input parameter of the first input, where the at least subset of the plurality of icons is moved from the first position to the second position, and the fourth icon is moved from the second position to the first position.

The icon arranging apparatus 1700 can implement various processes and achieve the same beneficial effects implemented by the electronic device in the foregoing method embodiments. To avoid repetition, details are not described herein again.

The icon arranging apparatus in this embodiment of this application may be an apparatus, or may be a component, an integrated circuit, or a chip in a terminal. The apparatus may be a mobile electronic device or may be a non-mobile electronic device. For example, the mobile electronic device may be a mobile phone, a tablet computer, a notebook computer, a palmtop computer, an in-vehicle electronic device, a wearable equipment, an ultra-mobile personal computer (ultra-mobile personal computer, UMPC), a netbook, a personal digital assistant (personal digital assistant, PDA), or the like. The non-mobile electronic device may be a server, a network attached storage (Network Attached Storage, NAS), a personal computer (personal computer, PC), a television (television, TV), a teller machine, a self-service machine, or the like. This is not specifically limited in this embodiment of this application.

The icon arranging apparatus in this embodiment of this application may be an apparatus with an operating system. The operating system may be an Android (Android) operating system, an ios operating system, or another possible operating system. This is not specifically limited in this embodiment of this application.

The icon arranging apparatus provided in this embodiment of this application can implement the processes implemented by the icon arranging apparatus in the method embodiment of FIG. 1 to FIG. 16. To avoid repetition, details are not described herein again.

In this embodiment of the present invention, a user may simultaneously perform an input on a plurality of icons, so that the plurality of icons are simultaneously arranged in batches according to an input parameter of the user input, to reduce operations by the user.

Optionally, the embodiments of this application further provide an electronic device, including a processor, a memory, and programs or instructions stored on the memory and capable of being run on the processor, where the programs or the instructions are executed by the processor to implement each process of the foregoing embodiments of the icon arranging method, and the same technical effects can be achieved. To avoid repetition, details are not described herein again.

It should be noted that the electronic device in this embodiment of this application includes the mobile electronic device and the non-mobile electronic device.

Figure 18:
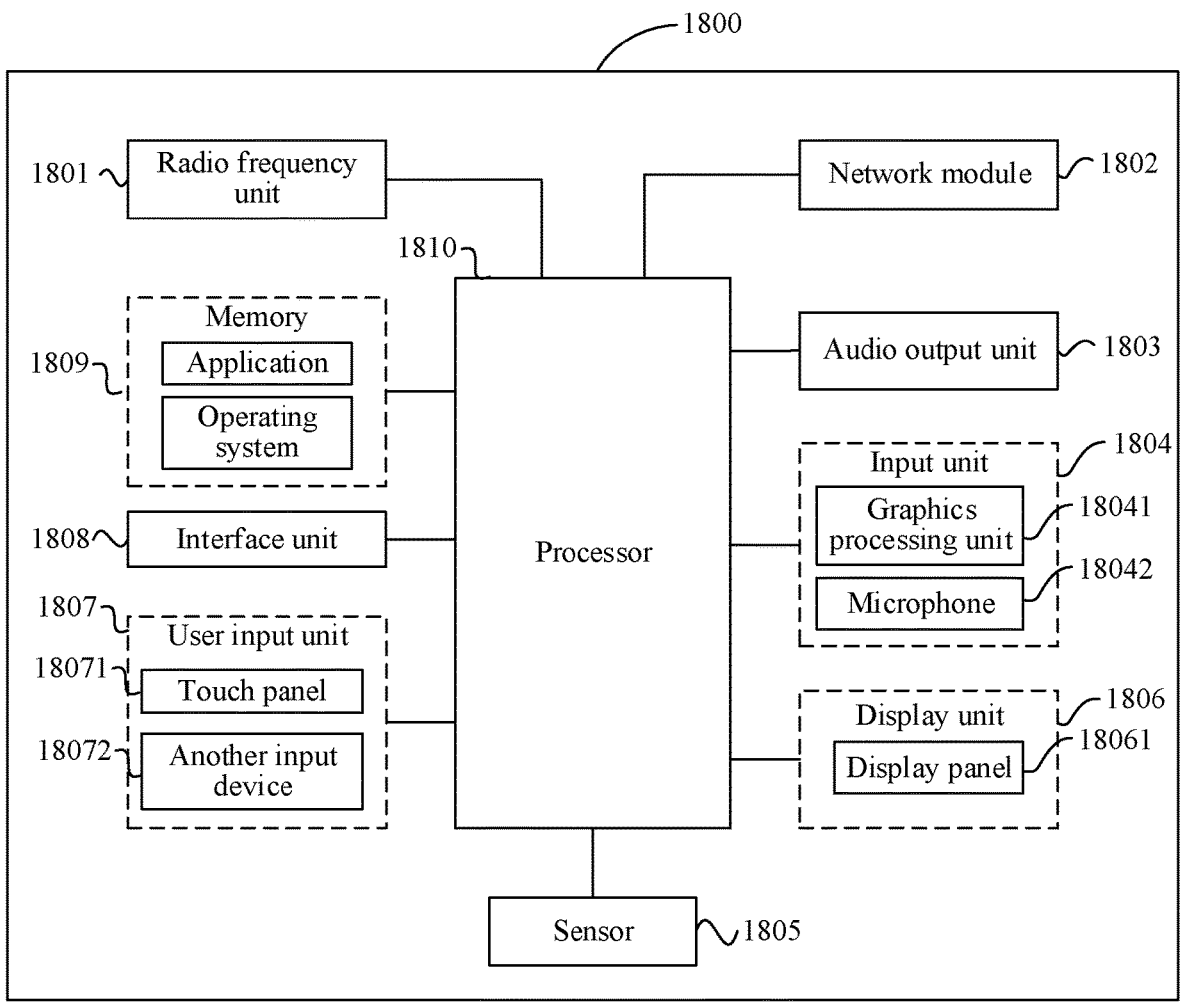
FIG. 18 is a structural diagram of an electronic device according to an embodiment of the present invention.

FIG. 18 is a schematic diagram of a hardware structure of an electronic device according to an embodiment of this application.

The electronic device 1800 includes, but is not limited to, components such as a radio frequency unit 1801, a network module 1802, an audio output unit 1803, an input unit 1804, a sensor 1805, a display unit 1806, a user input unit 1807, an interface unit 1808, a memory 1809, and a processor 1810.

A person skilled in the art may understand that the electronic device 1800 may further include the power supply (such as a battery) for supplying power to the components. The power supply may logically connect to the processor 1810 by using a power supply management system, thereby implementing functions, such as charging, discharging, and power consumption management, by using the power supply management system. The electronic device structure shown in FIG. 18 constitutes no limitation on an external device, and the electronic device may include more or fewer components than those shown in the figure, or some components may be combined, or a different component deployment may be used. Details are described herein again.

The processor 1810 is configured to:

control the user input unit 1807 to receive a first input on a plurality of icons; and arrange the plurality of icons in an arrangement manner corresponding to an input parameter of the first input in response to the first input, where the input parameter includes at least one of an input direction and an input track.

In this way, a user may simultaneously perform an input on a plurality of icons, so that the plurality of icons are simultaneously arranged in batches according to an input parameter of the user input, to reduce operations by the user.

Optionally, the input parameter includes the input direction; and that the process 1810 arranges the plurality of icons in an arrangement manner corresponding to an input parameter of the first input includes:

displaying the plurality of icons in a target row or a target column, where the target row or the target column is determined based on the input direction, and an angle between the target row and the input direction and an angle between the target column and the input direction are greater than a first preset angle and less than a second preset angle.

Optionally, the target row is perpendicular to the input direction, or the target column is perpendicular to the input direction.

Optionally, the processor 1810 is further configured to:

control the display unit 1806 to display a first icon in the target row or the target column; and control the display unit 1806 to display the plurality of icons in the target row or the target column where the first icon is located, where the first icon is an icon closest to a target screen edge in the plurality of icons, and the target screen edge is a screen edge to which the input direction points.

Optionally, that the processor 1810 controls the display unit 1806 to display the plurality of icons in a target row or a target column includes:

respectively displaying the plurality of icons in the target column, and keeping display rows corresponding to the plurality of icons unchanged;

or respectively displaying the plurality of icons in the target row, and keeping display columns corresponding to the plurality of icons unchanged.

Optionally, the input direction includes a first input direction and a second input direction, and the target row or the target column is determined based on the first input direction; and The processor 1810 is further configured to:

move the plurality of icons within the target row or the target column along the second input direction, so that every two icons in the target row or the target column are adjacent to each other.

Optionally, the input parameter includes the input track, and that the processor 1810 arranges the plurality of icons in an arrangement manner corresponding to an input parameter of the first input includes:

arranging the plurality of icons according to a pattern formed by the input track; and Optionally, that the processor 1810 receives a first input on a plurality of icons includes:

receiving a first sub-input on a second icon in the plurality of icons, and receiving a second sub-input on a third icon in the plurality of icons; and that the processor 1810 arranges the plurality of icons according to a pattern formed by the input track includes:

arranging the plurality of icons according to the pattern formed by the input track, where a position of the third icon is kept unchanged.

Optionally, at least a subset of the plurality of icons is displayed at a first position, and a fourth icon is displayed at a second position; and that the process 1810 arranges the plurality of icons in an arrangement manner corresponding to an input parameter of the first input includes:

arranging the plurality of icons in the arrangement manner corresponding to the input parameter of the first input, where the at least subset of the plurality of icons is moved from the first position to the second position, and the fourth icon is moved from the second position to the first position.

It should be understood that in this embodiment of this application, the input unit 1804 may include a graphics processing unit (Graphics Processing Unit, GPU) 18041 and a microphone 18042. The graphics processing unit 18041 performs processing on image data of a static picture or a video that is obtained by an image acquisition device (for example, a camera) in a video acquisition mode or an image acquisition mode. The display unit 1806 may include a display panel 18061, for example, the display panel 18061 configured in a form such as a liquid crystal display or an organic light-emitting diode. The user input unit 1807 includes a touch panel 18071 and another input device 18072. The touch panel 18071 is also referred to as a touchscreen. The touch panel 18071 may include two parts: a touch detection apparatus and a touch controller. The another input device 18072 may include, but not limited to, a physical keyboard, a functional key (such as a volume control key or a switch key), a track ball, a mouse, and a joystick, which are not described herein in detail. The memory 1809 may be configured to store a software program and various data, which includes, but not limited to, an application and an operating system. The processor 1810 may integrate an application processor and a modem processor. The application processor mainly processes an operating system, a user interface, an application program, and the like. The modem processor mainly processes wireless communication. It may be understood that the foregoing modem may either not be integrated into the processor 1810.

An embodiment of this application further provides a readable storage medium, storing programs or instructions, where the programs or the instructions are executed by a processor to implement each process of the foregoing embodiments of the icon arranging method, and the same technical effect can be achieved. To avoid repetition, details are not repeated herein again.

The processor is the processor in the electronic device in the foregoing embodiment. The readable storage medium includes a computer-readable storage medium such as a computer read-only memory (Read-Only Memory, ROM), a random access memory (Random Access Memory, RAM), a magnetic disk, or an optical disc.

An embodiment of this application further provides a chip, including a processor and a communication interface, where the communication interface is coupled to the processor, and the processor is configured to run programs or the instructions, to implement each process of the foregoing embodiments of the icon arranging method, and the same technical effect can be achieved. To avoid repetition, details are not repeated herein again.

It should be understood that, the chip mentioned in this embodiment of this application may also be referred to as a system-level chip, a system chip, a chip system, a system on chip, or the like.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that, the scope of the methods and apparatuses in the implementations of this application is not limited to performing the functions in the order shown or discussed, but may further include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

A person of ordinary skill in the art may be aware that, in combination with the examples of units and algorithm steps described in the embodiments disclosed in this specification, this application may be implemented by using electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the present disclosure.

Those skilled in the art can clearly understand that for convenience and conciseness of description, the specific working processes of the above-described systems, devices and units can be understood with reference to the corresponding processes in the above-described method embodiments and will not be repeated here.

In the embodiments provided in this application, it should be understood that the disclosed apparatus and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the related art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

It may be understood that, the embodiments described in the embodiments of the present disclosure may be implemented by using software, hardware, firmware, middleware, microcode, or a combination thereof. For implementation by hardware, a module, a unit, or a sub-unit may be implemented in one or more application-specific integrated circuits (Application Specific Integrated Circuits, ASIC), a digital signal processor (Digital Signal Processing, DSP), a digital signal processing device (DSP Device, DSPD), a programmable logic device (Programmable Logic Device, PLD), a field-programmable gate array (Field-Programmable Gate Array, FPGA), a general purpose processor, a controller, a microcontroller, a microprocessor, and other electronic units configured to perform the functions described in the present disclosure, or a combination thereof.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

The embodiments of this application are described above with reference to the accompanying drawings. However, this application is not limited to the foregoing specific implementations. The foregoing specific implementations are illustrative instead of limitative. Enlightened by this application, a person of ordinary skill in the art can make many forms without departing from the idea of this application and the scope of protection of the claims. All of the forms fall within the protection of this application.

What is claimed is:

1. An icon arranging method, comprising:
receiving a first input on a plurality of icons; and
arranging the plurality of icons in an arrangement manner corresponding to an input parameter of the first input in response to the first input, wherein
the input parameter comprises an input track,
and the arranging the plurality of icons in an arrangement manner corresponding to an input parameter of the first input comprises:
arranging the plurality of icons according to a pattern formed by the input track;
wherein the receiving the first input on the plurality of icons comprises:
receiving a first sub-input on a second icon in the plurality of icons, and receiving a second sub-input on a third icon in the plurality of icons; and
the arranging the plurality of icons according to a pattern formed by the input track comprises:
arranging the plurality of icons according to the pattern formed by the input track, wherein a position of the third icon is kept unchanged.

2. The method according to claim 1, wherein the input parameter comprises the input direction; and
the arranging the plurality of icons in an arrangement manner corresponding to an input parameter of the first input comprises:
displaying the plurality of icons in a target row or a target column, wherein
the target row or the target column is determined based on the input direction, and an angle between the target row and the input direction and an angle between the target column and the input direction are greater than a first preset angle and less than a second preset angle.

3. The method according to claim 2, wherein the target row is perpendicular to the input direction, or the target column is perpendicular to the input direction.

4. The method according to claim 2, wherein before the receiving the first input on the plurality of icons, the method further comprises:
displaying a first icon in the target row or the target column; and
the displaying the plurality of icons in a target row or a target column comprises:
displaying the plurality of icons in the target row or the target column where the first icon is located, wherein
the first icon is an icon closest to a target screen edge in the plurality of icons, and the target screen edge is a screen edge to which the input direction points.

5. The method according to claim 2, wherein
the displaying the plurality of icons in a target row or a target column comprises:
respectively displaying the plurality of icons in the target column, and keeping display rows corresponding to the plurality of icons unchanged;

or
respectively displaying the plurality of icons in the target row, and keeping display columns corresponding to the plurality of icons unchanged.

6. The method according to claim 2, wherein the input direction comprises a first input direction and a second input direction, and the target row or the target column is determined based on the first input direction; and after the displaying the plurality of icons in a target row or a target column, the method further comprises:
moving the plurality of icons within the target row or the target column along the second input direction, so that every two icons in the target row or the target column are adjacent to each other.

7. The method according to claim 1, wherein at least a subset of the plurality of icons is displayed at a first position, and a fourth icon is displayed at a second position; and
the arranging the plurality of icons in an arrangement manner corresponding to an input parameter of the first input comprises:
arranging the plurality of icons in the arrangement manner corresponding to the input parameter of the first input, wherein the at least subset of the plurality of icons is moved from the first position to the second position, and the fourth icon is moved from the second position to the first position.

8. An electronic device, comprising: a memory, a processor and a computer program stored in the memory and executable by the processor, wherein the processor executes the computer program to:
receive a first input on a plurality of icons; and
arrange the plurality of icons in an arrangement manner corresponding to an input parameter of the first input in response to the first input, wherein
the input parameter comprises an input track,
and the processor executes the computer program to:
arrange the plurality of icons according to a pattern formed by the input track;
wherein the processor executes the computer program to:
receive a first sub-input on a second icon in the plurality of icons, and receive a second sub-input on a third icon in the plurality of icons; and
arrange the plurality of icons according to the pattern formed by the input track, wherein a position of the third icon is kept unchanged.

9. The electronic device according to claim 8, wherein the input parameter comprises the input direction; and
the processor executes the computer program to:
display the plurality of icons in a target row or a target column, wherein
the target row or the target column is determined based on the input direction, and an angle between the target row and the input direction and an angle between the target column and the input direction are greater than a first preset angle and less than a second preset angle.

10. The electronic device according to claim 9, wherein the target row is perpendicular to the input direction, or the target column is perpendicular to the input direction.

11. The electronic device according to claim 9,
wherein the processor executes the computer program to:
display a first icon in the target row or the target column; and
display the plurality of icons in the target row or the target column where the first icon is located, wherein
the first icon is an icon closest to a target screen edge in the plurality of icons, and the target screen edge is a screen edge to which the input direction points.

12. The electronic device according to claim 9, wherein the processor executes the computer program to:
respectively display the plurality of icons in the target column, and keep display rows corresponding to the plurality of icons unchanged;
or
respectively display the plurality of icons in the target row, and keep display columns corresponding to the plurality of icons unchanged.

13. The electronic device according to claim 9, wherein the input direction comprises a first input direction and a second input direction, and the target row or the target column is determined based on the first input direction;
the processor executes the computer program to: move the plurality of icons within the target row or the target column along the second input direction, so that every two icons in the target row or the target column are adjacent to each other.

14. The electronic device according to claim 8, wherein at least a subset of the plurality of icons is displayed at a first position, and a fourth icon is displayed at a second position; and
the processor executes the computer program to: arrange the plurality of icons in the arrangement manner corresponding to the input parameter of the first input, wherein the at least subset of the plurality of icons is moved from the first position to the second position, and the fourth icon is moved from the second position to the first position.

15. A readable storage medium, storing programs or instructions, wherein a processor executes the programs or the instructions to:
receive a first input on a plurality of icons; and
arrange the plurality of icons in an arrangement manner corresponding to an input parameter of the first input in response to the first input, wherein
the input parameter comprises an input track,
and the processor executes the programs or the instructions to:
arrange the plurality of icons according to a pattern formed by the input track;
wherein the processor executes the programs or the instructions to:
receive a first sub-input on a second icon in the plurality of icons, and receive a second sub-input on a third icon in the plurality of icons; and
arrange the plurality of icons according to the pattern formed by the input track, wherein a position of the third icon is kept unchanged.

16. The readable storage medium according to claim 15, wherein the input parameter comprises the input direction; and
the processor executes the programs or the instructions to:
display the plurality of icons in a target row or a target column, wherein
the target row or the target column is determined based on the input direction, and an angle between the target row and the input direction and an angle between the target column and the input direction are greater than a first preset angle and less than a second preset angle.

17. The readable storage medium according to claim 16, wherein the target row is perpendicular to the input direction, or the target column is perpendicular to the input direction.

18. The readable storage medium according to claim 16, wherein the processor executes the programs or the instructions to:
- display a first icon in the target row or the target column;
- the processor executes the programs or the instructions to:
  - display the plurality of icons in the target row or the target column where the first icon is located, wherein
- the first icon is an icon closest to a target screen edge in the plurality of icons, and the target screen edge is a screen edge to which the input direction points.

19. The readable storage medium according to claim 16, wherein the processor executes the programs or the instructions to:
- respectively display the plurality of icons in the target column, and keep display rows corresponding to the plurality of icons unchanged;
- or
- respectively display the plurality of icons in the target row, and keep display columns corresponding to the plurality of icons unchanged.

20. The readable storage medium according to claim 16, wherein the input direction comprises a first input direction and a second input direction, and the target row or the target column is determined based on the first input direction;
- the processor executes the programs or the instructions to: move the plurality of icons within the target row or the target column along the second input direction, so that every two icons in the target row or the target column are adjacent to each other.

* * * * *